(12) United States Patent
Moalemi et al.

(10) Patent No.: US 10,418,181 B2
(45) Date of Patent: Sep. 17, 2019

(54) SINGLE LAYER CAPACITORS

(71) Applicant: Eulex Components Inc, San Diego, CA (US)

(72) Inventors: Ali Moalemi, San Diego, CA (US); Euan Patrick Armstrong, San Diego, CA (US)

(73) Assignee: Eulex Components Inc, San Diego, CA (US)

( * ) Notice: Subject to any disclaimer, the term of this patent is extended or adjusted under 35 U.S.C. 154(b) by 0 days.

(21) Appl. No.: 15/492,930

(22) Filed: Apr. 20, 2017

(65) Prior Publication Data

US 2017/0309405 A1 Oct. 26, 2017

Related U.S. Application Data

(60) Provisional application No. 62/374,496, filed on Aug. 12, 2016, provisional application No. 62/325,300, filed on Apr. 20, 2016.

(51) Int. Cl.
*H01G 4/38* (2006.01)
*H01G 4/30* (2006.01)
(Continued)

(52) U.S. Cl.
CPC .............. *H01G 4/38* (2013.01); *H01G 4/232* (2013.01); *H01G 4/30* (2013.01); *H01G 4/33* (2013.01); *H01G 4/1209* (2013.01)

(58) Field of Classification Search
CPC ............ H01G 4/38; H01G 4/232; H01G 4/30; H01G 4/33; H01G 4/1209
See application file for complete search history.

(56) References Cited

U.S. PATENT DOCUMENTS

| 4,685,197 A | 8/1987 | Riemenschneider et al. |
| 6,542,352 B1 * | 4/2003 | Devoe .................. H01G 4/228 |
| | | 361/306.1 |

(Continued)

FOREIGN PATENT DOCUMENTS

CN 204270875 U 4/2015

OTHER PUBLICATIONS

"General & High Cap", Samsung Electro-Mechanics, MLCC (Multi-Layer Ceramic Capacitors), Nov. 7, 2013, retrieved from http://www.samsungsem.com/global/product/passive-component/mlcc/general-n-high-cap/index.jsp.

(Continued)

*Primary Examiner* — Dion Ferguson
(74) *Attorney, Agent, or Firm* — KPPB LLP

(57) ABSTRACT

Capacitors having form factors (e.g., dimensions and functionality) comparable with traditional single layer capacitors, but with considerably higher capacitance and methods of their manufacture are provided. Capacitors and methods that implement capacitors where at least one of the dielectric layers is reduced in thickness post firing to produce a device robust enough for automated handling and provide a stable surface for wire-bonding are also provided. Capacitors and methods that implement an internal electrode between at least two layers of pre-fired ceramic dielectric are also provided. Capacitors and methods that implement the integration of multiple dielectric types in a single device producing high frequency performance characteristics are also provided. Capacitors and dielectrics that implement the combination of a multi-layer capacitor with a thin single layer capacitor to further increase operating frequency and capacitance are also provided. Capacitors and methods that implement a single layer capacitor capable of combination with any other passive electronic component such as a (Continued)

resistor or inductor further improving functionality and reducing space requirements on the circuit are also provided.

14 Claims, 16 Drawing Sheets

(51) Int. Cl.
  *H01G 4/33* (2006.01)
  *H01G 4/232* (2006.01)
  *H01G 4/12* (2006.01)

(56) References Cited

U.S. PATENT DOCUMENTS

| | | | |
|---|---|---|---|
| 6,831,824 B1 | 12/2004 | Devoe et al. | |
| 7,035,080 B1* | 4/2006 | Devoe | H01G 4/232 361/303 |
| 7,602,599 B1* | 10/2009 | Hsu | H01G 4/005 361/303 |
| 7,869,187 B2* | 1/2011 | McKinzie, III | H01G 7/06 361/303 |
| 9,390,859 B2 | 7/2016 | Choi et al. | |
| 2007/0077687 A1 | 4/2007 | Bothe et al. | |
| 2007/0230088 A1 | 10/2007 | Fujimura et al. | |
| 2008/0062613 A1* | 3/2008 | Wilson | H01G 4/06 361/301.4 |
| 2009/0059464 A1* | 3/2009 | McKinzie, III | H01G 4/30 361/281 |
| 2010/0238603 A1* | 9/2010 | Chung | H01G 4/228 361/301.4 |
| 2011/0024171 A1* | 2/2011 | Nakamura | H01G 4/012 174/258 |
| 2011/0247186 A1 | 10/2011 | Yu et al. | |
| 2013/0314838 A1* | 11/2013 | Hwang | H01G 4/385 361/301.4 |
| 2014/0104748 A1 | 4/2014 | Park et al. | |
| 2014/0133065 A1* | 5/2014 | Armstrong | H05K 3/328 361/321.2 |
| 2016/0133689 A1* | 5/2016 | Guo | H01G 4/33 257/532 |
| 2016/0155569 A1 | 6/2016 | Masai et al. | |
| 2016/0211079 A1 | 7/2016 | Armstrong et al. | |
| 2016/0268048 A1* | 9/2016 | Zelner | H01G 4/012 |
| 2017/0011851 A1 | 1/2017 | Seo et al. | |
| 2017/0077019 A1* | 3/2017 | Sugaya | H01G 4/33 |

OTHER PUBLICATIONS

"Increasing Capacitance of Multilayer Ceramic Chip Capacitors", Tech Web, Sep. 8, 2016, retrieved from http://micro.rohm.com/en/techweb/tech-info/engineer/2578.

* cited by examiner

SINGLE LAYER CAPACITORS

CROSS-REFERENCE TO RELATED APPLICATIONS

This application claims priority to U.S. Provisional Patent Application Nos. 62/325,300, filed Apr. 20, 2016 and 62/374,496, filed Aug. 12, 2016, the disclosures of which are incorporated herein by reference.

FIELD OF THE INVENTION

The current application is related to high capacitance single layer capacitors and methods of their manufacture.

BACKGROUND OF THE INVENTION

A capacitor is a passive two-terminal electrical component that stores electrical energy in an electric field. The effect of a capacitor is known as capacitance, which is defined as the ratio of the electric charge on each conductor to the potential difference between them. The unit of capacitance in the International System of Units (SI) is the farad (F), defined as one coulomb per volt (1 C/V). Capacitance values of typical capacitors for use in general electronics range from about 1 pF ($10^{-12}$ F) to about 1 mF ($10^{-3}$ F).

The physical form and construction of practical capacitors vary widely and many capacitor types are in common use. Most capacitors contain at least two electrical conductors often in the form of metallic plates or surfaces separated by a dielectric medium. A conductor may be a foil, thin film, sintered bead of metal, or an electrolyte. The nonconducting dielectric acts to increase the capacitor's charge capacity. Materials commonly used as dielectrics include glass, ceramic, plastic film, paper, mica, and oxide layers. Capacitors are widely used as parts of electrical circuits in many common electrical devices for blocking direct current while allowing alternating current to pass. In analog filter networks, they smooth the output of power supplies. In resonant circuits they tune radios to particular frequencies. In electric power transmission systems, they stabilize voltage and power flow.

SUMMARY OF THE INVENTION

Many embodiments are directed to high performance capacitors and their method of manufacture.

In some embodiments the high performance capacitor includes:
  a first capacitor having first and second conductive layers and a first dielectric substrate disposed therebetween;
  a second capacitor having a single-layer second dielectric substrate defining a dielectric thickness and having first and second surfaces, and wherein the first surface is disposed adjacent at least a portion of the second conductive layer of the first capacitor, and wherein the second surface has a third conductive layer disposed thereon; and
  wherein a least a portion of the second conductive layer is uncovered by the second dielectric substrate leaving an exposed portion of the second conductive layer;
  wherein at least each of the conductive layers is interconnected with a portion of a circuit; and
  wherein the dielectric thickness of the single-layer dielectric substrate is modifiable after affixation of the second dielectric substrate to the second conductive layer and before interconnection of the third conductive layer therewith.

In some such embodiments the first conductive layer is bonded to a portion of the circuit.

In still some such embodiments the exposed surface of the second conductive and the third conductive layers are independently wire-bonded to a portion of the circuit.

In yet some such embodiments the first dielectric substrate is a single monolithic layer.

In still yet some such embodiments at least the second dielectric substrate is formed of a material selected from the group consisting of GBBL type, high k-type, P-type, NPQ, NPO, X7R and Y5V.

In still yet some such embodiments the high performance capacitor includes:
  at least one additional capacitor comprising:
    a single-layer additional dielectric substrate defining a dielectric thickness and having first and second surfaces, and wherein the first surface of the additional dielectric substrate is disposed adjacent at least a portion of the third conductive layer of the second capacitor, and wherein the second surface has a fourth conductive layer disposed thereon; and
  wherein a least a portion of the third conductive layer is uncovered by the second dielectric substrate leaving an exposed portion of the third conductive layer;
  wherein at least each of the conductive layers is interconnected with a portion of a circuit; and
  wherein the dielectric thickness of the additional dielectric substrate is modifiable after affixation of the additional dielectric substrate to the third conductive layer and before interconnection of the fourth conductive layer therewith.

In still yet some such embodiments the high performance capacitor includes a plurality of additional capacitors, each disposed atop one another in a stacked configuration.

In still yet some such embodiments the third conductive layer overlaps only a portion of the second dielectric substrate such that a border is formed around the edge of the second dielectric substrate that remains uncovered by the third conductive layer.

In still yet some such embodiments the first dielectric substrate comprises a multilayer capacitor.

In still yet some such embodiments the multilayer capacitor comprises two sets of opposing internal electrodes, wherein a first set of internal electrodes is interconnected to the first conductive layer by a first via, and wherein the second set of internal electrodes is interconnected to the second conductive layer by a second via.

In still yet some such embodiments the second conductive layer comprises two independent sections, wherein a first section interconnects the first and second dielectric substrates, and wherein the second section interconnects with the second via such that the first and section sections may be independently interconnected to portions of the circuit.

In still yet some such embodiments the first section further interconnects with the first via.

In still yet some such embodiments the high performance capacitor includes at least one passive electrical component interconnected with at least one of the second or third conductive layers.

In still yet some such embodiments the at least one passive electrical component is selected from one of either a resistor or an inductor.

In still yet some such embodiments the first dielectric substrate is a single layer having at least one via interconnecting the first and second conductive layers.

In some other embodiments a method of manufacturing a high performance capacitor includes:
- prefiring a first dielectric substrate having first and second surfaces;
- applying a first conductive layer to the second surface thereof;
- adhering a second dielectric substrate atop the first conductive layer to form an assembly comprising first and second dielectric substrates;
- firing the assembly;
- lapping the second dielectric substrate to a desired thickness to obtain a desired capacitance in said second dielectric layer;
- applying a second conductive layer atop the lapped second dielectric substrate; and
- dicing the substrate into singulated devices.

In some such embodiments the method includes applying a third conductive layer to the first surface of the first dielectric substrate prior to dicing.

In still some such embodiments the first conductive layer is formed of one of either a metal filled epoxy or conductive thick film paste.

In yet some such embodiments firing may comprise one of either curing or firing.

In still yet some such embodiments the second conductive layer is disposed by vapor deposition.

In still some other embodiments the method of manufacturing a high performance capacitor includes:
- providing a first dielectric substrate sheet having first and second surfaces;
- applying a conductive material to the first and second surfaces to form first and second conductive layers;
- providing a second dielectric substrate sheet having third and fourth surfaces and forming a plurality of holes therein;
- applying a conductive material to the fourth surface to form a plurality of conductive pads thereon;
- stacking the second dielectric substrate atop the first dielectric sheet such that the third surface is disposed adjacent the second conductive layer;
- laminating the stacked dielectric substrates together to form an assembly comprising first and second dielectric substrates;
- lapping the second dielectric substrate to a desired thickness to obtain a desired capacitance in said second dielectric layer;
- dicing the substrate into singulated devices; and
- firing the singulated devices.

In some such embodiments the second conductive layer is disposed on only a portion of the second surface such that a portion of the first dielectric substrate is disposed in direct contact with the second dielectric substrate.

In still some such embodiments the first conductive layer and the conductive pads are applied after lamination.

In yet some such embodiments firing may comprise one of either curing or firing.

In still yet some such embodiments the firing is performed prior to dicing.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein.

DETAILED DISCLOSURE

Figure 1A:
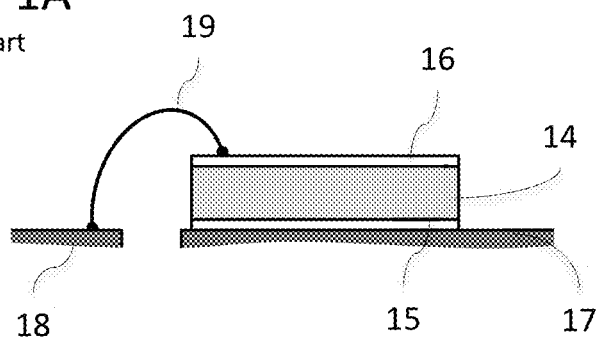
FIGS. 1A to 1C provide schematics of single layer capacitors in accordance with the prior art.

The embodiments of the invention described herein are not intended to be exhaustive or to limit the invention to precise forms disclosed. Rather, the embodiments selected for description have been chosen to enable one skilled in the art to practice the invention.

Turning now to the drawings, capacitors having form factors (e.g., dimensions and functionality) comparable with traditional single layer capacitors, but with considerably higher capacitance and methods of their manufacture are provided. Many embodiments of the current invention provide capacitors and methods that implement capacitors where at least one of the dielectric layers is reduced in thickness post firing to produce a device robust enough for automated handling and provide a stable surface for wire-bonding. Many embodiments of the current invention provide capacitors and methods that implement an internal electrode between at least two layers of pre-fired ceramic dielectric. Exemplary dielectrics in these embodiments include, but are not limited to, GBBL type and high k dielectrics. Many embodiments of the current invention provide capacitors and methods that implement the integration of multiple dielectric types in a single device producing high frequency performance characteristics. Exemplary dielectrics in these embodiments include, but are not limited to, P-type, NPQ, NPO, X7R, Y5V. Many embodiments of the current invention provide capacitors and dielectrics that implement the combination of a multi-layer capacitor with a thin single layer capacitor to further increase operating frequency and capacitance. Many embodiments of the current invention provide capacitors and methods that implement a single layer capacitor capable of combination with any other passive electronic component such as a resistor or inductor further improving functionality and reducing space requirements on the circuit. Many embodiments of the current invention provide capacitors and methods that implement a thin single layer capacitor configured to be mounted to a short block or device containing at least one through-via, simplifying connection to a circuit. Many embodiments of the current invention provide capacitors and methods that implement at least one thin single layer capacitor interconnected to a Low Temperature Co-fired Ceramic (LTCC) substrate.

These and other embodiments of capacitors and methods described below allow for devices to be produce with much higher capacitance, and allowing devices to be made smaller, ultimately saving space on the circuit and allowing miniaturization or the ability to add redundant circuits in the same space for high reliability applications.

High Capacitance Single Layer Capacitors

Single layer capacitors have a form factor for assembling into electronic circuits. Typically, the bottom of the device is soldered or bonded with conductive epoxy to an electrical contact on the circuit. Connections to the other side of the device are made from the top of the device. Single layer capacitors are typically manufactured by metallizing two sides of a thin sheet of sintered ceramic. The ceramic sheet is then diced to the required size using a saw or other grinding technique. The capacitance (c) of the device for a fixed case size is determined by the dielectric properties of the ceramic material and the thickness of the device and can be described by the simplified equation $c=k/d$ where k is the dielectric constant of the ceramic and d is the distance between the two metalized plates.

Figure 1B:
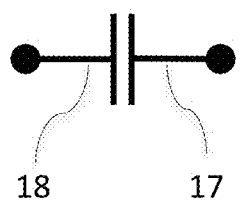

Schematics of such conventional single layer capacitors are shown in FIGS. 1A and 1B. Typically, the bottom of the device (15) is soldered or bonded with conductive epoxy to an electrical contact on the circuit (17). Connections to the other side of the circuit (18) are made from the top of the device (16) using a wire bond (19). Single layer capacitors are typically manufactured by metallizing two sides of a thin sheet of sintered ceramic (14). The ceramic sheet is then diced to the required size using a saw or other grinding technique. The capacitance of the device for a fixed case size is determined by the dielectric properties of the ceramic material and the thickness of the device.

To increase the capacitance the device can be made thinner. However, these particularly thin devices would not have sufficient strength to be handled during manufacture and more importantly assembly into a circuit and would break or fracture. It is also extremely difficult to manufacture such a thin sheet of ceramic in preparation for metallization and dicing. The minimum thickness of these devices is typically limited to 5-7 mils (130-180 microns).

Figure 1C:
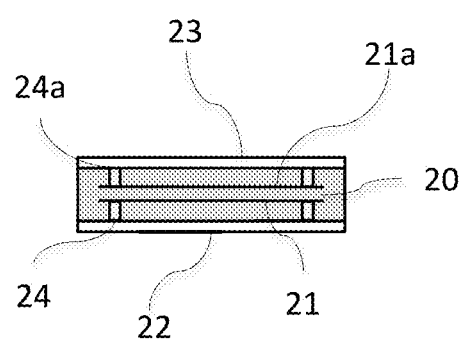

Previous attempts to resolve these issues include manufacturing a device with at least one internal layer connected to the top or bottom pad using a via or external electrical connection. A schematic of such a structure is provided in FIG. 1C, and includes a buried pair of electrodes (21) (21a) within the device, each connected to an external conductor (22) (23) through the use of a via (24) (24a).

This solution allows a much smaller gap between electrodes and hence a higher capacitance. These devices typically have a 10:1 capacitance improvement over traditional technology. However, this via is often difficult to form requiring drilling a small hole, filling with a conductive material and firing. There can be issues with connection between the via and the internal and external electrodes often multiple vias are used to counter this. The via can also be detrimental to the electrical performance of the device both as a result of the quality of the connection between the via and both the internal and external electrodes and the type of material used to create the via. This These materials often contain non-conductive elements that while aiding in shrinkage matching and possibly bonding to the materials around it actually inhibit electrical performance and are inferior to a simple wire-bond connection. Slight shrinkage of the via-fill material can affect the topography of the external layers of the device making wire-bonding difficult as a flat surface is typically preferred. And finally, these devices can only be used with dielectrics that support the ability to co-fire an internal electrode.

Embodiments of High Performance Single Layer Capacitors

Figure 2A:
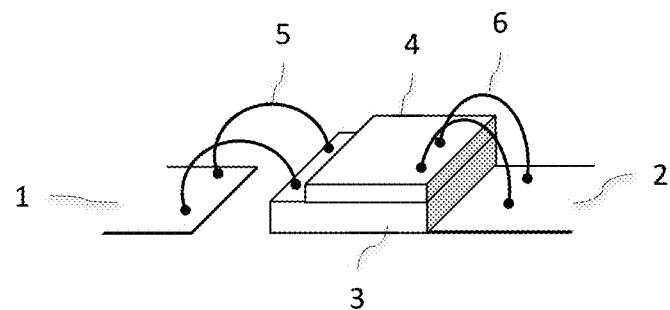
FIGS. 2A to 2C provide schematics diagrams of high performance capacitors in accordance with embodiments.
Figure 2B:
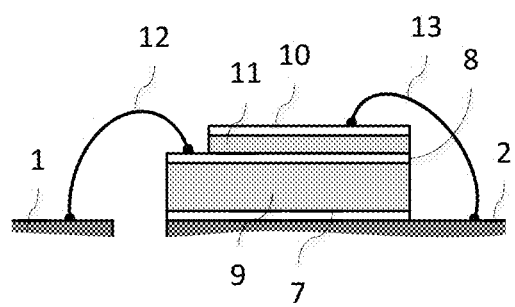
Figure 2C:
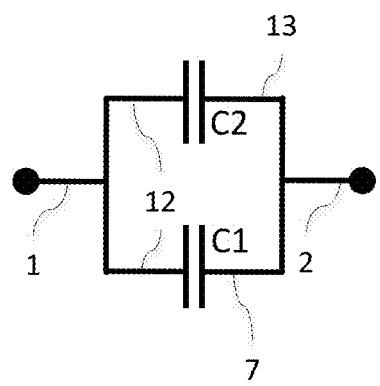

Many embodiments are directed to high performance single layer capacitors configured to overcome the inherent form and performance limitations described above. As shown in FIGS. 2A to 2C, such embodiments generally include two stacked single layer capacitors (3 & 4), where the top side of a first single layer capacitor (3) and the bottom side of a second single layer capacitor (4) is connected through a first wire-bond (5) to a first side of an electronic circuit (1), where the bottom side of the first single layer capacitor (3) is bonded to a second side of the electronic circuit (2) through a direct metalized connection thereto (not shown), and where the top side of the second single layer capacitor (4) is connected to the second side of the electronic circuit (2) through a second wire-bond (6).

In various embodiments, as shown in FIG. 2B, the single layer capacitors (3 & 4 in FIG. 2A) comprise first and second dielectric (e.g., ceramic, polymeric, etc.) substrates (9 & 11) arranged adjacent each other, and each having metallization or conductive plates (7, 8 & 10) disposed on top and bottom surfaces thereof. Where the first dielectric substrate (9) has an outer metallization or conductive plate (7) disposed on a surface distal to the second dielectric substrate (11). Where the second dielectric substrate (11) has an outer metallization or conductive plate (10) disposed on a surface distal to the first dielectric substrate (9). And where first and second dielectric substrates (9 & 11) are interconnected via a common metallization or conductive plate (8).

In such embodiments, a first capacitor (3 in FIG. 2A) is formed between conductive plates (8) and (7) the value of which is proportional to the dielectric constant of the dielectric substrate material (9) and inversely proportional to the distance between the two conductors. A second capacitor (4 in FIG. 2A) is formed between conductive plates (8) and (10). The value of this capacitor is directly proportional to the dielectric constant of the dielectric substrate material (11) and inversely proportional to the distance between conductive plates (8) and (10). Because the thickness of the dielectric portion (11) can be made thinner after being mounted to first capacitor substrate (9) by lapping or other technique, the capacitance between plates (8) and (10) can be significantly higher than that possible for the first capacitor.

In forming a circuit in accordance with embodiments, as shown in FIGS. 2A & 2B, a portion of the intermediate metallization or conductive plate (8) is left uncovered by the second dielectric substrate (11) such that the intermediate metallization or conductive plate (8) may be interconnected to the first side of circuit (1) using a suitable electrical interconnection (e.g., wire-bond) (12). The first dielectric substrate (9) would typically be soldered or epoxy bonded through the metallization or conductive plate (7) to second side of the electrical circuit (2). The second capacitor would then be wire bonded (13) to the second side of the circuit through the outer metallization or conductive plate (10).

FIG. 2C provides a schematic showing the resulting electrical circuit with both sides of the circuit (1) and (2) that would be formed in such embodiments. As shown, the first formed capacitor C1 and the second capacitor C2, with the corresponding electrical connections (12), (13) and (7), are in parallel in various embodiments such that the resulting capacitance CR is given as CR=C1+C2.

Figure 3A:
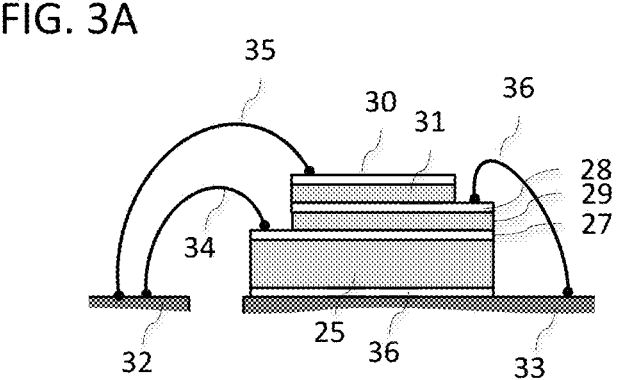
FIGS. 3A and 3B provide schematics diagrams of high performance capacitors in accordance with embodiments.
Figure 3B:
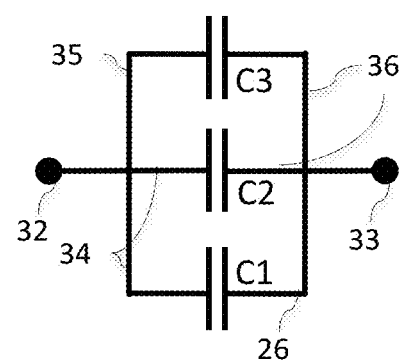

Although embodiments incorporating two capacitors are described above in other embodiments an additional ceramic chip can be added to the top surface in the same manor that the first capacitor is added to the substrate, and the second capacitor is added atop the first capacitor. Specifically, as shown in FIG. 3A, in many such embodiments an existing two capacitor configuration is provided in which a first capacitor is formed between conductive plates (26) and (27) the value of which is proportional to the dielectric constant of the dielectric substrate material (25) and inversely proportional to the distance between the two conductors, and a second capacitor is formed between conductive plates (27) and (28) the value of which capacitor is directly proportional to the dielectric constant of the dielectric substrate material (29) and inversely proportional to the distance between conductive plates (27) and (28). As in previous embodiments, it should be understood that the thickness of the dielectric substrate (29) can be made thinner after being mounted to first capacitor (25) by lapping or other technique, such that the capacitance between plates (27) and (28) can be significantly higher than for the first capacitor. In such higher level capacitor systems, an additional dielectric substrate material (31) is mounted atop the second capacitor, and then either directly metalized, or lapped to reduce thickness and metalized, as previously described. Such a three capacitor system could be mounted to the circuit board in the same manner as previously described, with a direct conductive interconnecting the first capacitor to the second side of the circuit (33) and a wire bond interconnected between an exposed portion of the top metallization layer (27) of the first capacitor and the first side of the circuit (32), and a second wire bond interconnecting an exposed portion of the top metallization layer (28) of the second capacitor to the second side of the circuit (33). However, an additional wire-bond (35) would be made between the top metallization layer (30) of the additional capacitor and the first side of the electronic circuit (32). The resulting electrical schematic is show schematically in FIG. 3B. Although only three capacitor layers are shown, it will be understood that it is possible to repeat this step any number of times, creating increasingly complex structures. The resulting capacitance equation would be given by: $C_R=C_1+C_2+C_3+\ldots C_N$.

Although the capacitors in accordance with many embodiments may incorporate any suitable combination of dielectric material and conductive material, in various embodiments, exemplary dielectrics include, but are not limited to, GBBL type, high k-type, P-type, NPQ, NPO, X7R and Y5V, among others. Similarly any suitable conductive material may be incorporated, including, for example, any compatible metallization material. In addition, as discussed above, these dielectric and conductive layers may be provided in any thickness suitable to provide the desired capacitance. In various embodiments, the minimum thickness of the substrates is only limited by the dielectric type. For example, high k and GBBL dielectrics have relatively large grain sizes. The larger the grain size, the thicker the dielectric substrate would have to be to avoid defects creating shorting problems. Other dielectrics (e.g., p-type, etc.) can be made extremely thin as these material defects are not an issue. In such embodiments, the limiting factor to the thinness of the dielectric layer would be voltage breakdown and possibly arcing between the conductors.

Figure 4:
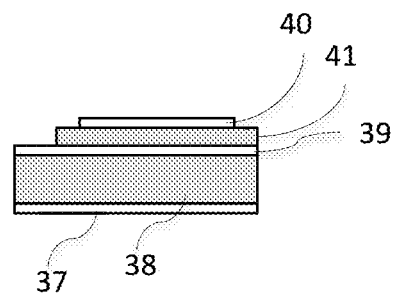
FIG. 4 provides a schematic diagram of a high performance capacitor having buffer zones disposed on a top conductive layer in accordance with embodiments.

To resolve potential voltage breakdown issues, many embodiments incorporate a top conductor that does not cover the entire top dielectric layer, such that borders are provided between the edges of the conductor and the edges of the capacitor. An exemplary embodiment of such a structure is provided in FIG. 4. As shown, a first capacitor formed by the combination of dielectric layer (38) and first and second conductive layers (37 & 39). A second capacitor formed by the combination of dielectric layer (41) being positioned between conductive layers (39) and (40). However, in contrast to the previous embodiments, the edge of the top conductor (40) is pulled back from the edge of the top sheet of dielectric (41) to provide a non-conducting border around the conductor. This effect can be achieved, for example, by use of a mask or screen when applying the top conductor, or by some other method such as laser skiving or laser sintering of the top conductor. Alternatively, a non-conductive border or overfill could be applied prior to singulating the devices.

Although the previous embodiments have described the addition of a high capacitance single-layer capacitor to another single-layer capacitor, in many embodiments a high capacitance single-layer capacitor may also be used in conjunction with a multi-layer capacitor. One exemplary embodiment of such a capacitor is provided in FIG. 5. As shown, in this embodiment the monolithic dielectric substrate (42) is provided that incorporates a multi-layer circuit comprised of two sets of opposing internal electrodes (43) and (46), one set connected to a bottom conductive plate (44) by via (45) and the second set connected to top conductive plate (47) through a second via (48). This circuit may be manufactured using MLCC techniques and can be fired to form a monolithic body containing an array of multi-layer capacitors using those known techniques. In accordance with embodiments, a second dielectric substrate is then placed on top and lapped (if desired) to form a thin dielectric layer (49) having a conductive layer (50) on top thereof. One of the advantages of using a pre-fired substrate and top ceramic chip is that different types of dielectrics may be used in such embodiments. For example, a high k 'lossy' dielectric could be used for the multi-layer portion of the device and a lower k, high Q material could be used for the top device.

Although one exemplary embodiment combining a multi-layer and single-layer capacitor is described above, it should be understood that variations of this configuration could be made to extend the operating frequency of the device when used in certain broadband and/or high frequency applications. For example, FIG. 6A shows another exemplary embodiment of a complex dielectric substrate containing a multi-layer capacitor and a single layer capacitor.

Figure 5:
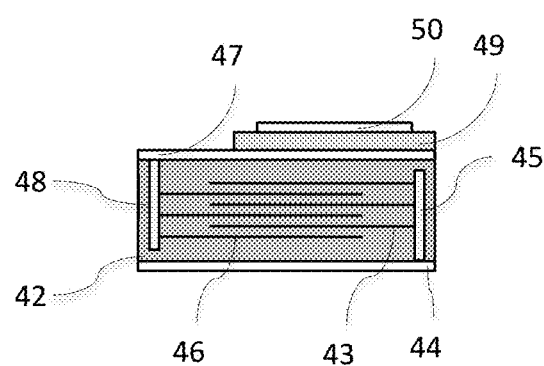
FIG. 5 provides a schematic diagram of a high performance capacitor incorporating a multi-layer capacitor in accordance with embodiments.

As in the embodiment shown in FIG. 5, the monolithic multi-layer capacitor (51) incorporates a multi-layer circuit comprised of two sets of opposing internal electrodes (52) and (52a), one set connected to a bottom conductive plate (53) by via (54) and the second set connected to top conductive plate (55) through a second via (56). A separate dielectric substrate (59) is again attached to the top conductive layer (58) of this substrate, and may be lapped to a required thickness and metalized with a conductive layer (60) to form a third capacitor. A first side of the electronic circuit (62) is connected to one side of the multi-layer capacitive device by soldering or epoxy bonding bottom conductive pad (53) to the circuit. An additional electric interconnection (e.g., wire-bond) (64) connects the upper conductive layer (60) of the top capacitor to the same first side of said circuit (62). The second side of the electronic circuit (61) is connected to the opposing side of the top capacitor (59) and opposing side of the single layer capacitor contained within the monolithic block by connected an electric interconnection (e.g., wire-bond) (63) to conductive pad (58). The second side of the electronic circuit (61) is also connected to the multi-layer capacitor portion of the monolithic block by connecting a second electric interconnection (e.g., wire-bond) (65) to top conductive pad (55).

Although not essential, many other embodiments incorporate other passive components to the device before adding the top capacitor. An example of such an embodiment is shown in FIG. 6A where a resistor (66) is included between conductive pads (55) and (58). Addition of such a resistor would also be advantageous as it would eliminate the need for wire-bond (65) and produce the circuit as shown in FIG. 6B, in which three capacitors are connected in series with a resistor (66).

Figure 6A:
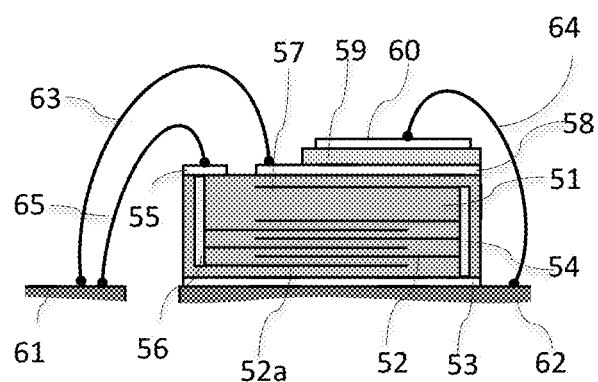
FIGS. 6A and 6B provide schematics diagrams of high performance capacitors incorporating resistors in accordance with embodiments.
Figure 6B:
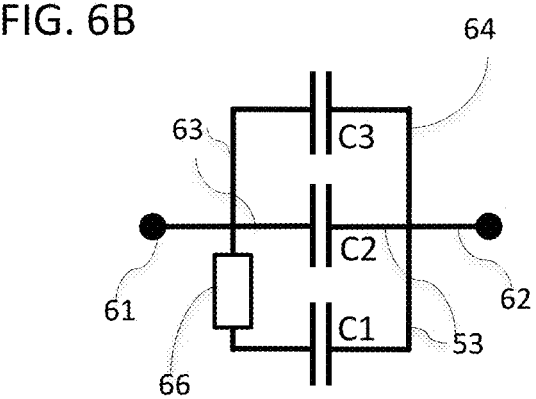
Figure 7A:
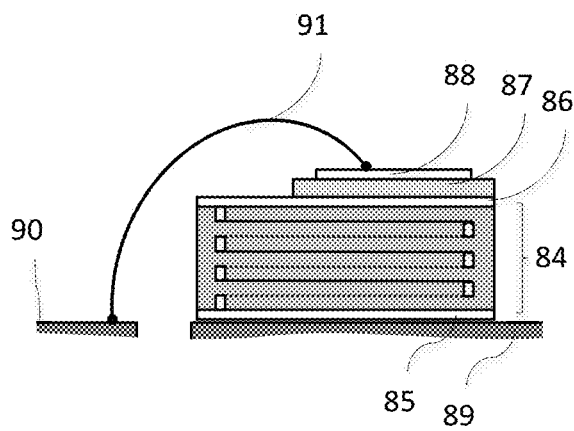
FIGS. 7A and 7B provide schematics diagrams of high performance capacitors incorporating inductors in accordance with embodiments.
Figure 7B:
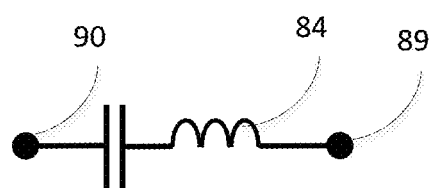

Although an additional resistor component is shown in FIGS. 6A & 6B, and discussed above, it will be understood that alternative passive components can be used as a substrate to increase functionality of the circuit in accordance with many embodiments of the invention. One exemplary embodiment is shown schematically in FIG. 7A. In this exemplary embodiment, a multi-layer chip inductor (84) with conductive top and bottom plates (86) and (85) is provided. The dielectric substrate (87) of the capacitor is mounted to one side of the substrate (42) through the conductive top plate (86). The dielectric substrate may then be lapped to a desired thickness, metalized with a conductive top layer (88), and then singulated. During interconnection, the bottom plate (85) of the inductor substrate (84) is connected to one side of the electronic circuit (89), and the top conductor (88) of the capacitor is connected using an electrical interconnection (e.g., wire-bond) (91) to the other side of the electronic circuit (90). This structure and interconnection produces a capacitor and inductor in series as shown in FIG. 7B.

Figure 8:
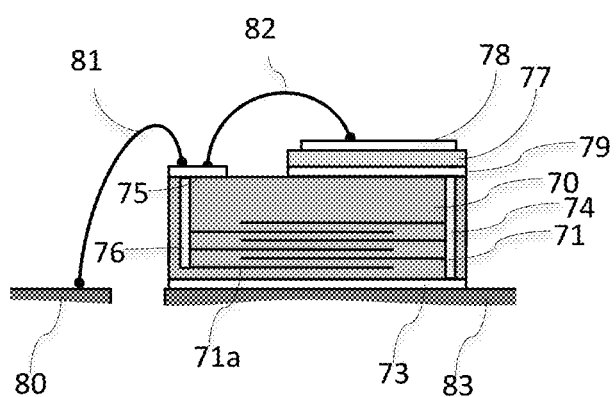
FIG. 8 provides a schematic diagram of a high performance capacitor incorporating a reduced wire-bond interconnection configuration in accordance with embodiments.

Although methods of interconnecting capacitors in accordance with embodiments are shown in FIGS. 1 to 6, it should be understood that various constructions may be provided to reduce the number of wire-bonds used to connect these devices in circuits. For example, in one embodiment, shown schematically in FIG. 8, a multi-layer substrate (70) may be provide with a through-via (74) connecting both an internal set of electrodes (71) and one side of the top capacitor (77) conductive layer (79) to the bottom conductor of the multilayer device (73), which may in turn be soldered or epoxy bonded to one side of the electronic circuit (83). In turn, electrical interconnections (81 & 82) could be used to connect the top conductive layer (78) of the top capacitor (77) and the second set of internal electrodes (71a), which are in turn connected through a second via (76), through a common conductive pad (75) to a second side of the circuit (80).

Figure 9:
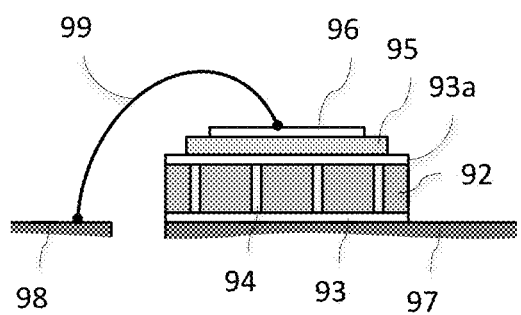
FIG. 9 provides a schematic diagram of a high performance capacitor incorporating a reduced wire-bond interconnection configuration in accordance with embodiments.

Alternatively, as shown schematically in FIG. 9, connections to the external circuit may be simplified further using multiplicity of internal structure. In these embodiments, the top capacitor dielectric (95) is mounted to a short block prior to lapping and forming of top conductor (96). This short block could be a ceramic body (92) such as alumina with top and bottom conductors (93 & 93a) connected using one or more vias (94). Due to the proposed method of manufacture, described in greater detail below, the top ceramic dielectric chip (95) could be a high k dielectric such as a GBBL.

Although specific embodiments of capacitors are described herein, it will be understood that many alternative embodiments may be made that incorporate the capabilities described herein, and/or may be made in accordance with methods of manufacture.

Methods of Manufacturing Single Layer Capacitors

Although the above discussion has focused on embodiments of high performance capacitors, many embodiments of the invention are also directed to methods of manufacturing capacitors having form factors similar to a single layer capacitor using pre-fired sheets of dielectric.

Figure 10:
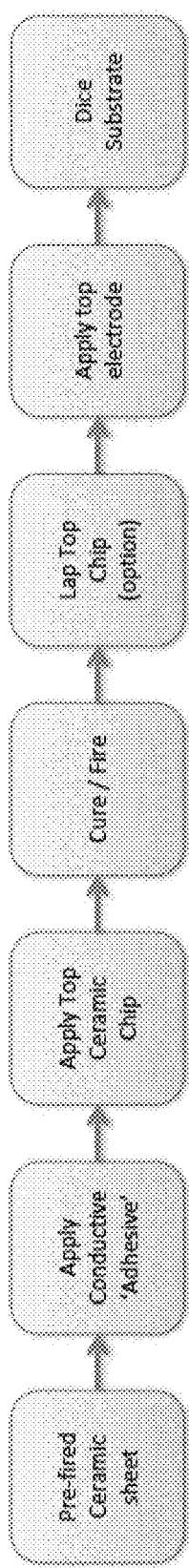
FIG. 10 provides a flow-chart of a method of manufacturing high performance capacitors in accordance with embodiments.

Many embodiments are directed to embodiments that incorporate pre-fired dielectric substrates. A flow-chart of one such embodiment is shown in FIG. 10. A dielectric sheet (e.g., formed of a pre-fired ceramic) is first provided and a conductive adhesive layer applied followed by the application of a top dielectric substrate. This dielectric substrate may then be cured/fired, lapped as necessary to create the appropriate thickness and then topped by a second conductive layer to form the top capacitor. The sheet may then be diced as necessary to form the individual capacitors.

Figure 11A:
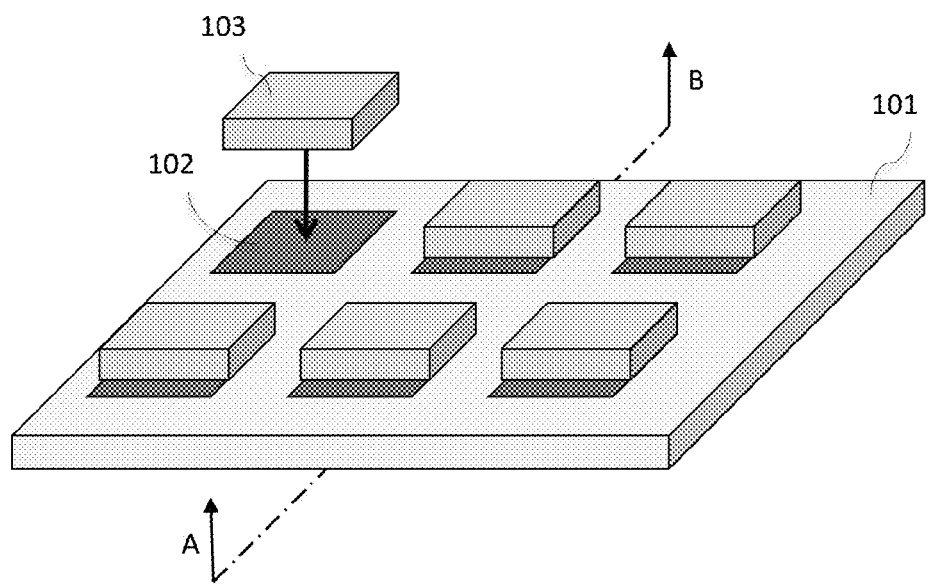
FIGS. 11A to 11E provide schematics of a method of manufacturing high performance capacitors in accordance with embodiments.
Figure 11B:
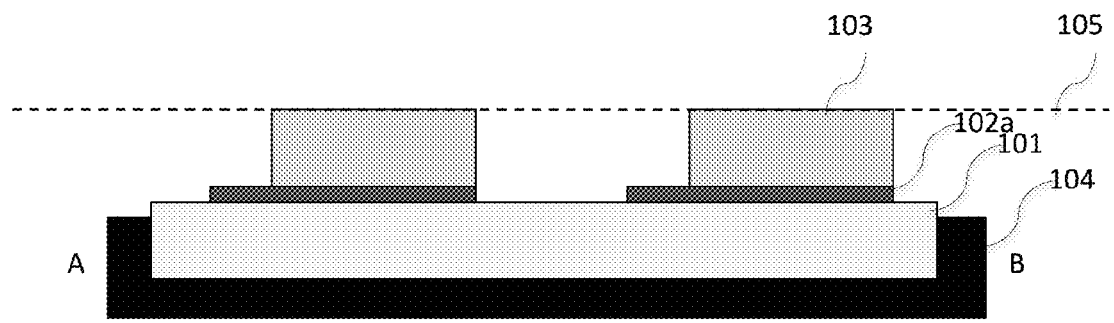
Figure 11C:
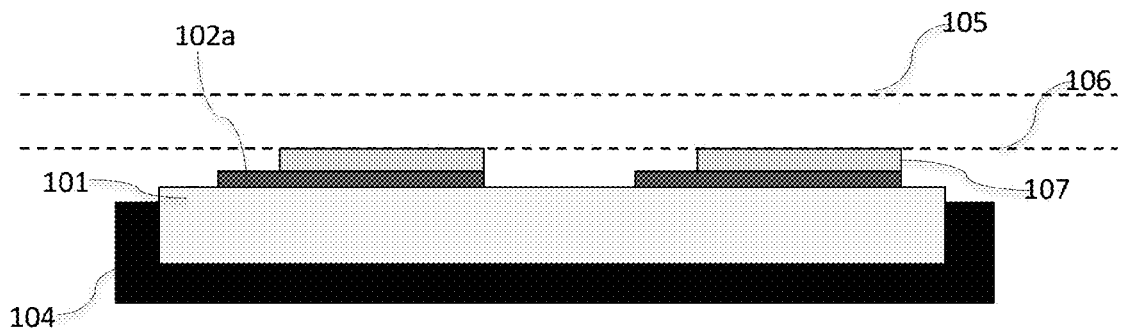
Figure 11D:
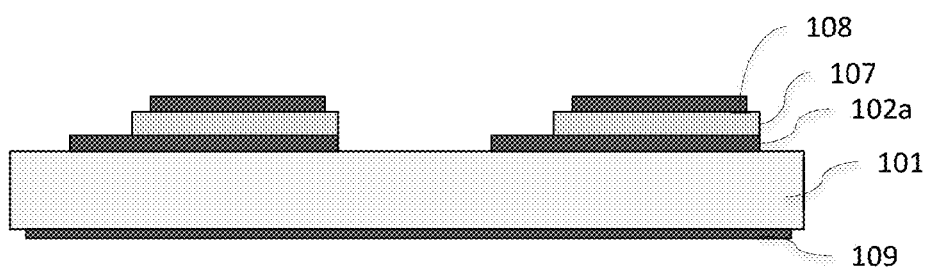
Figure 11E:
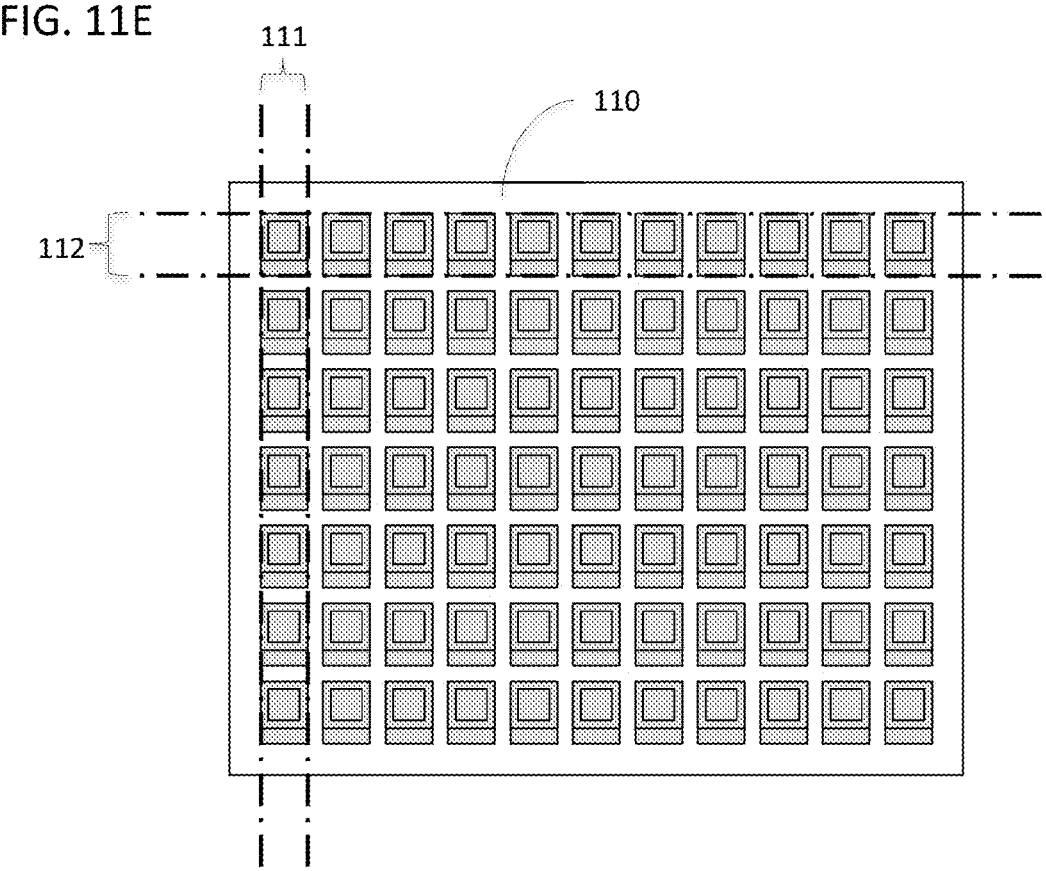

Schematics of such a method are provided collectively in FIGS. 11A to 11E. As shown, in FIG. 11A, in an initial process, dielectric top substrates (e.g., ceramic chips) (103) are mounted to a bottom dielectric substrate (101) using a conductive material (e.g., metallization layer) (102) such as a metal filled epoxy or conductive thick film paste. The entire assembly is then cured or fired depending on the type of conductive material used. FIG. 11B shows a cross section of the assembly, including substrates (101 & 103), interconnected through conductive adhesive layer (102a), and mounted into a fixture (104). The top dielectric substrates (103) now being supported by the bottom substrate (101), can be mechanically lapped to reduce the thickness of the substrate to a desired level, thus allowing for control of the capacitance of the top dielectric substrate. FIG. 11C shows the substrates after lapping where two lines indicate the original thickness (105) and the new reduced thickness (106). After lapping, the substrate (101) is removed from any tooling and cleaned in preparation for metallization, as shown in FIG. 11D. As illustrated, the bottom side of the bottom substrate (101) is metalized with a conductive layer (109), and the top side of the newly reduced dielectric substrate (107) is metalized with a conductive layer (108). In such methods, metallization may be performed using any suitable vapor deposition techniques. At this point the substrate can be diced using standard sawing techniques to produce a number of singulated devices from the substrate, as shown in FIG. 11E. In this plan view, a substrate (110) hosting an array of devices shows two pairs of cut lines in the horizontal (112) and vertical (111) direction. It should be understood that any suitable cutting technique and arrangement may be utilized with embodiments.

Although an embodiment of a method for forming high performance single layer capacitors is described above, it will be understood that other embodiments may be contemplated. In many such embodiments, a dielectric substrate is provided that has top and bottom surfaces fully metalized. This fully metalized dielectric substrate is then placed in a fixture or tooling that contains cavities. Conductive epoxied are then applied to the cavities and pre-fired, lapped, diced and metalized capacitor chips are loaded into the cavities using vibratory loading equipment. Once the cavities are occupied by the capacitor chips, the final substrate can be diced as desired into discrete components.

Methods of Manufacturing Single Layer Capacitors Using Sheets of Ceramic Tape

Figure 12:
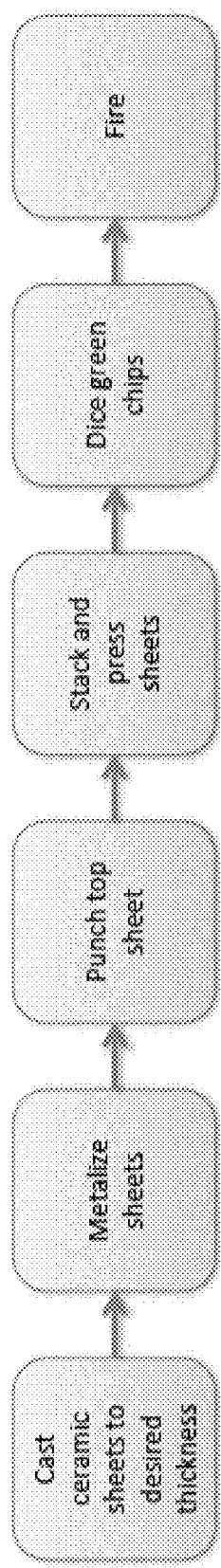
FIG. 12 provides a flow-chart of a method of manufacturing high performance capacitors using green capacitor sheets in accordance with embodiments.

Although previous embodiments have focused on methods of forming high performance single layer capacitors using dielectric substrates formed from pre-fired ceramic substrates, many embodiments of the invention are directed towards methods of assembling at least a pair of capacitors with a shared common electrode to have a comparable form factor to a single layer capacitor and that can be mounted to an external electrical circuit using standard techniques currently employed to mount single layer capacitors. FIG. 12 provides a flow-chart in accordance with such methods.

As summarized in the flow-chart the method generally forming sheets of a dielectric material (e.g., a ceramic sheet) of a desired thickness and then metallizing the sheet. A punch or other method is then used to formed holes or cavities within the sheet at a depth and in a number and placement desired. The sheets are then stacked and pressed together using a suitable technique, such as, for example, lamination. The stacked sheets are then diced as descried into individual chips and the entire assembly is fired.

Figure 13A:
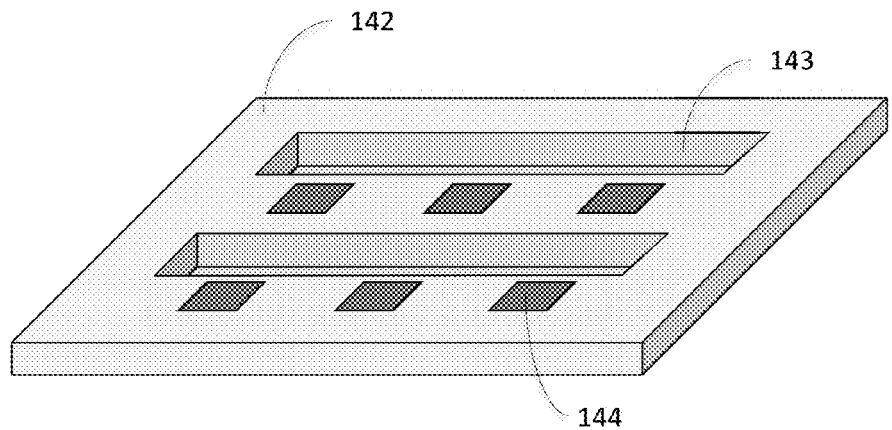
FIGS. 13A to 13E provide schematics of a method of manufacturing high performance capacitors using green capacitor sheets in accordance with embodiments.
Figure 13B:
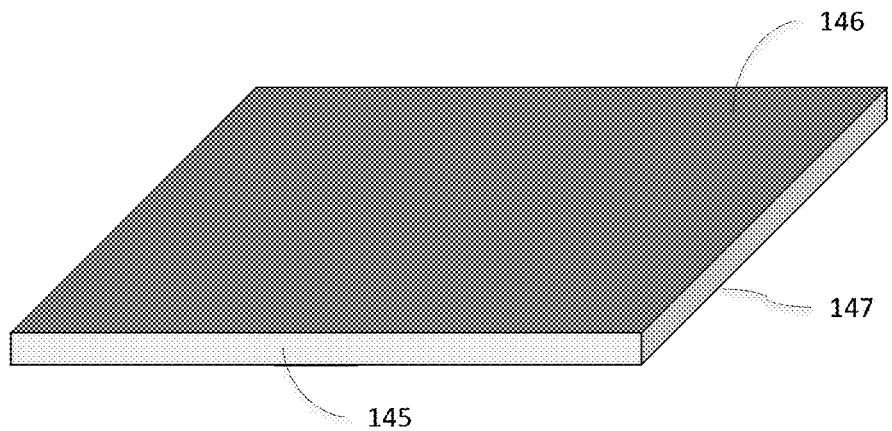
Figure 13C:
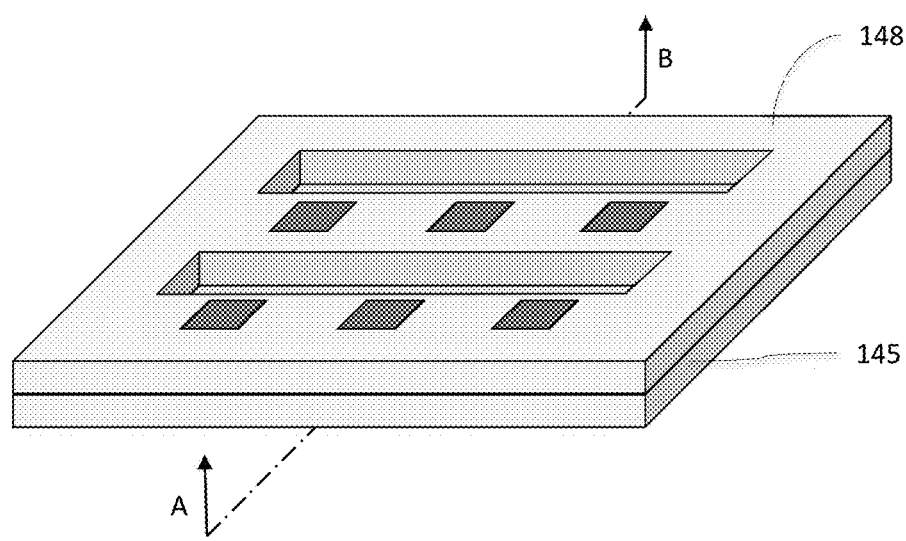
Figure 13D:
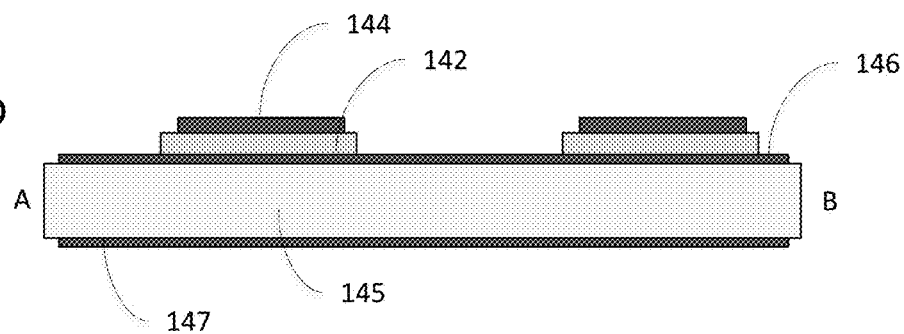
Figure 13E:
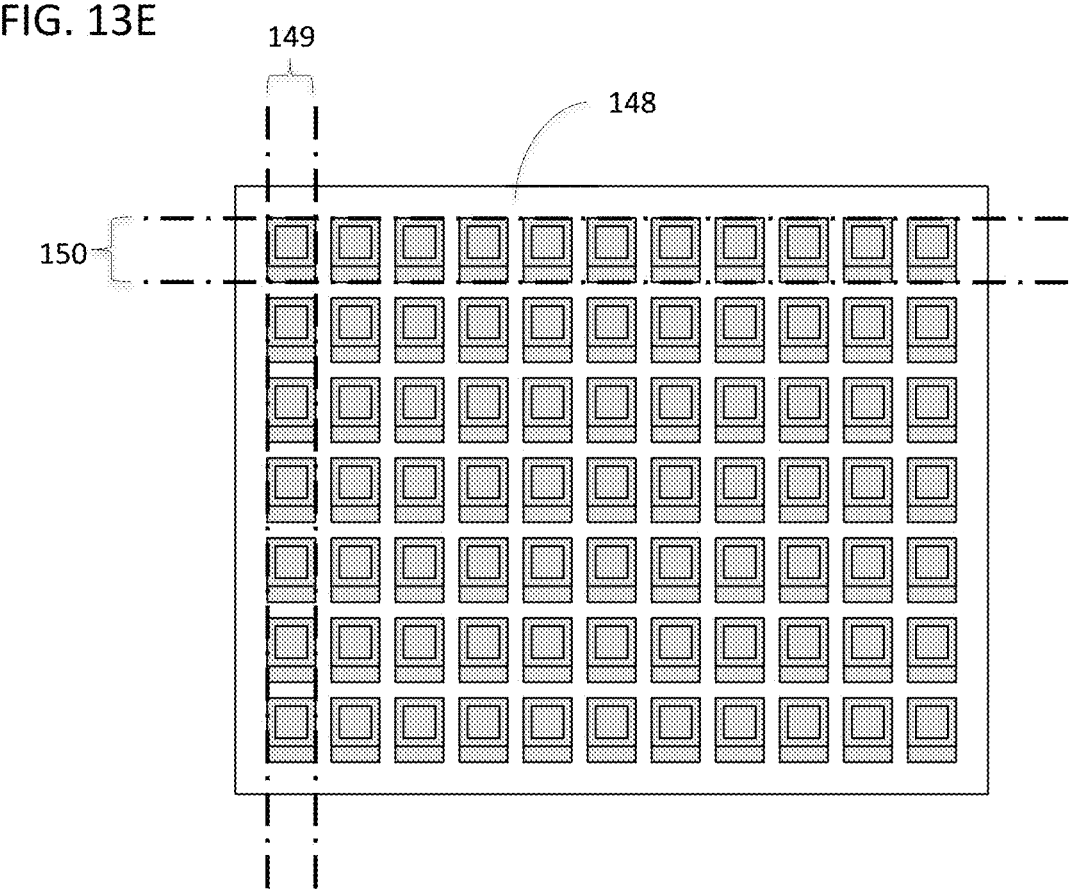

Schematics of such a method are provided collectively in FIGS. 13A to 13E. As shown, in FIG. 13B, a green sheet of dielectric (e.g., ceramic) tape (145) is metalized on both top side (146) and bottom (147) with a conductor suitable for co-firing with the green state ceramic material. A second green ceramic sheet (142) with pre-cut holes (143) is metalized with conductive pads (144), as shown in FIG. 13A. These two sheets (142 & 145) are then stacked together, as shown in FIG. 13C, and laminated using suitable equipment such as an iso-static press. FIG. 13D shows a cross-section of the laminated sheets where the top sheet (142) is significantly thinner than the bottom sheet (145), it will be understood that both of the sheets may be formed or lapped to a desired thickness during the process before assembly. In this schematic, the three conductive elements are shown (147), (146), and (144). The green assembly is then diced using standard cutting or sawing techniques to produce a number of singulated devices, as shown in FIG. 13E. Specifically, the figure shows a plan view of a substrate (148) hosting an array of devices, and shows two pairs of cut lines in the horizontal (150) and vertical (149) direction. It will be understood that any arrangement of elements and any dicing scheme may be used to form singulated capacitors as desired. Regardless of the number and arrangement, the discrete components are then sintered in a kiln using a suitable temperature profile.

Although one exemplary embodiment of methods of manufacturing capacitors is provided above, it will be understood that modifications may be made to further improve the process. For example, in accordance with an embodiment of the invention, the top-side metallization (146) of the bottom green sheet (145) may be patterned to allow some of the ceramic material to show through. This would provide better adhesion between the plates in the later lamination stage to ensure the two sheets (145) and (142) are fully bonded.

In yet another alternative embodiment, only the top-side (146) of green ceramic sheet (145) would be metallized prior to laminating. (This could incorporate a pattern allowing the ceramic sheet to show through, as described above.) The bottom conductive layer (147) and top conductive pads (144) could then be added later using thick film techniques or post firing using vapor deposition techniques. Alternatively, only the bottom-side (not shown) of the top ceramic sheet could be metalized prior to lamination.

In still another alternative embodiment, the laminated array (148) could sintered and then singulated into devices post firing using a saw or other suitable technique for dicing fired ceramic. In such an embodiment, the bottom conductive surface (147) and top conductive pad (144) could be applied using vapor depositing techniques post sintering but prior to singulation.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A high performance capacitor comprising:
   a first capacitor having first and second conductive layers and a first dielectric substrate disposed between a top surface of the first conductive layer and a bottom surface of the second conductive layer;
   a second capacitor having a single-layer second dielectric substrate defining a dielectric thickness and having first and second surfaces, and wherein the first surface is disposed adjacent at least a portion of a top surface of the second conductive layer of the first capacitor, and wherein the second surface is disposed adjacent a bottom surface of a third conductive layer disposed thereon; and
   wherein a least a portion of the second conductive layer is uncovered by the second dielectric substrate leaving an exposed portion of the top surface of the second conductive layer;
   wherein at least each of the conductive layers is interconnected with a portion of a circuit; and
   wherein the dielectric thickness of the single-layer dielectric substrate is modifiable after affixation of the second dielectric substrate to the second conductive layer and before interconnection of the third conductive layer therewith.

2. The high performance capacitor of claim 1, wherein the bottom surface of the first conductive layer is bonded to a portion of the circuit.

3. The high performance capacitor of claim 1, wherein the exposed portion of the top surface of the second conductive and a top surface of the third conductive layers are independently wire-bonded to a portion of the circuit.

4. The high performance capacitor of claim 1, wherein the first dielectric substrate is a single monolithic layer.

5. The high performance capacitor of claim 4, wherein at least the second dielectric substrate is formed of a material selected from the group consisting of GBBL type, high k-type, P-type, NPQ, NPO, X7R and Y5V.

6. The high performance capacitor of claim 1, comprising at least one additional capacitor comprising:
- a single-layer additional dielectric substrate defining a dielectric thickness and having first and second surfaces, and wherein the first surface of the additional dielectric substrate is disposed adjacent at least a portion of the top surface of the third conductive layer of the second capacitor, and wherein the second surface has a bottom surface of a fourth conductive layer disposed thereon; and
- wherein a least a portion of the third conductive layer is uncovered by the second dielectric substrate leaving an exposed portion of the top surface of the third conductive layer;
- wherein at least each of the conductive layers is interconnected with a portion of a circuit; and
- wherein the dielectric thickness of the additional dielectric substrate is modifiable after affixation of the additional dielectric substrate to the third conductive layer and before interconnection of the fourth conductive layer therewith.

7. The high performance capacitor of claim 6, further comprising a plurality of additional capacitors, each disposed atop one another in a stacked configuration wherein at least a portion of at least a top surface of each of conductive layer of each capacitor is exposed such that an electrical interconnection can be made with a circuit thereto.

8. The high performance capacitor of claim 1, wherein the third conductive layer overlaps only a portion of the second dielectric substrate such that a border is formed around the edge of the second dielectric substrate that remains uncovered by the third conductive layer.

9. A high performance capacitor comprising:
- a first capacitor having first and second conductive layers and a first dielectric substrate disposed between a top surface of the first conductive layer and a bottom surface of the second conductive layer;
- a second capacitor having a single-layer second dielectric substrate defining a dielectric thickness and having first and second surfaces, and wherein the first surface is disposed adjacent at least a portion of a top surface of the second conductive layer of the first capacitor, and wherein the second surface is disposed adjacent a bottom surface of a third conductive layer disposed thereon; and
- wherein a least a portion of the second conductive layer is uncovered by the second dielectric substrate leaving an exposed portion of the top surface of the second conductive layer;
- wherein at least each of the conductive layers is interconnected with a portion of a circuit; and
- wherein the dielectric thickness of the single-layer dielectric substrate is modifiable after affixation of the second dielectric substrate to the second conductive layer and before interconnection of the third conductive layer therewith; and
- wherein the first dielectric substrate comprises a multi-layer capacitor.

10. The high performance capacitor of claim 9, wherein the multilayer capacitor comprises two sets of opposing internal electrodes, wherein a first set of internal electrodes is interconnected to the first conductive layer by a first via, and wherein the second set of internal electrodes is interconnected to the second conductive layer by a second via.

11. The high performance capacitor of claim 10 wherein the second conductive layer comprises two independent sections, wherein a first section interconnects the first and second dielectric substrates, and wherein the second section interconnects with the second via such that the first and section sections may be independently interconnected to portions of the circuit.

12. The high performance capacitor of claim 11, wherein the first section further interconnects with the first via.

13. The high performance capacitor of claim 1, further comprising at least one passive electrical component interconnected with at least one of the second or third conductive layers.

14. The high performance capacitor of claim 12, wherein the at least one passive electrical component is selected from one of either a resistor or an inductor.

* * * * *